US011373495B2

(12) United States Patent
Madden et al.

(10) Patent No.: US 11,373,495 B2
(45) Date of Patent: Jun. 28, 2022

(54) SUPERVISING PROPERTY ACCESS WITH PORTABLE CAMERA

(71) Applicant: ObjectVideo Labs, LLC, Tysons, VA (US)

(72) Inventors: Donald Madden, State College, PA (US); Jeffrey A. Bedell, Tysons, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/052,749

(22) Filed: Aug. 2, 2018

(65) Prior Publication Data
US 2019/0043326 A1 Feb. 7, 2019

Related U.S. Application Data

(60) Provisional application No. 62/588,455, filed on Nov. 20, 2017, provisional application No. 62/540,228, filed on Aug. 2, 2017.

(51) Int. Cl.
H04N 7/18 (2006.01)
G08B 13/196 (2006.01)
G08B 25/08 (2006.01)
G07C 9/00 (2020.01)

(52) U.S. Cl.
CPC ..... G08B 13/1966 (2013.01); G07C 9/00571 (2013.01); G07C 9/00658 (2013.01); G07C 9/00896 (2013.01); G08B 13/19621 (2013.01); G08B 13/19636 (2013.01); G08B 13/19671 (2013.01); G08B 13/19682 (2013.01); G08B 13/19684 (2013.01); G08B 25/08 (2013.01); H04N 7/185 (2013.01); H04N 7/186 (2013.01); G07C 2209/08 (2013.01)

(58) Field of Classification Search
CPC .......... H04N 7/18; H04N 7/185; H04N 7/186; G08B 13/1966; G08B 13/19684
USPC .................................................. 348/156, 143
See application file for complete search history.

(56) References Cited

U.S. PATENT DOCUMENTS 6,323,782 B1 * 11/2001 Stephens ............ G07C 9/00103
340/10.31
9,573,684 B2 * 2/2017 Kimchi ................. B64C 39/024
9,734,644 B2 * 8/2017 Samad .................... G07C 9/253
(Continued)

FOREIGN PATENT DOCUMENTS

WO WO2015/167872 11/2015
WO WO2017/079006 5/2017

OTHER PUBLICATIONS

PCT International Search Report and Written Opinion in International Application No. PCT/US18/44950, dated Oct. 16, 2018, 13 pages.

(Continued)

Primary Examiner — Trang U Tran
(74) Attorney, Agent, or Firm — Fish & Richardson P.C.

(57) ABSTRACT

A computer-implemented method includes obtaining a delivery schedule for a property, determining that a portable camera used by a visitor is at the property, determining that the portable camera corresponds to the delivery schedule, in response to determining that the portable camera corresponds to the delivery schedule, providing access to the property, and obtaining a video recorded by the portable camera.

19 Claims, 8 Drawing Sheets

(56) References Cited

U.S. PATENT DOCUMENTS

| | | |
|---|---|---|
| 10,217,306 B2 * | 2/2019 | Lampert ............... H04N 7/186 |
| 10,347,063 B1 * | 7/2019 | LaRovere ............... G07C 1/32 |
| 2005/0057653 A1 | 3/2005 | Maruya |
| 2011/0317920 A1 | 12/2011 | Senior |
| 2013/0017812 A1 | 1/2013 | Foster |
| 2015/0159401 A1 | 6/2015 | Patrick et al. |
| 2016/0033966 A1 | 2/2016 | Farris et al. |
| 2016/0105650 A1 | 4/2016 | Carter |
| 2016/0182850 A1 | 6/2016 | Thompson |
| 2016/0189502 A1 | 6/2016 | Johnson et al. |
| 2017/0046891 A1 | 2/2017 | Trivelpiece et al. |
| 2017/0103628 A1 | 4/2017 | Lampert et al. |

OTHER PUBLICATIONS

Extended European Search Report in European Application No. 18841551.7, dated Jun. 29, 2020, 7 pages.
PCT International Preliminary Report on Patentability in International Application No. PCT/US2018/044950, dated Feb. 4, 2020, 8 pages.

* cited by examiner

SUPERVISING PROPERTY ACCESS WITH PORTABLE CAMERA

CROSS REFERENCE TO RELATED APPLICATIONS

This application claims benefit of U.S. Provisional Application No. 62/540,228, filed on Aug. 2, 2017, and U.S. Provisional Application No. 62/588,455, filed on Nov. 20, 2017, both titled "Supervising Property Access With Portable Camera," disclosures of which are incorporated by reference in their entirety.

TECHNICAL FIELD

This disclosure relates to property monitoring technology and, for example, utilizing a portable camera for a property access control.

BACKGROUND

Security and surveillance systems have been utilized for both residential and commercial properties. Such systems may utilize a central monitoring system to detect when an alleged intrusion has occurred. For instance, the central monitoring system may be alerted when a motion sensor that has been mounted at a particular portion of the property detects motion. In some instances, the central monitoring system may transmit an alert to an operator's call center, or local law enforcement, that indicates that there may be a break-in at the property from which the alert originated.

SUMMARY

Techniques are described for monitoring technology, for example, integrating a monitoring system with a portable camera that a visitor to a monitored property may carry to gain access to the property to perform scheduled tasks at the property and record performance of the scheduled tasks. For example, techniques are described for processes of granting access to the property for the purposes of delivery, service, maintenance, etc. via the portable camera such as a body-worn camera device worn by the visitor conducting the delivery, service, maintenance, etc., where the video from the camera device can be used by the visitor's employer and the property owner/user/customer to monitor the visitor's actions. In some implementations, a property owner/user/customer may provide a visitor with remote assistance and guidance for a task of the visitor at the property via communication using the portable camera. The automated process of supervising property access through the portable camera may improve user convenience and home security.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques are described for integrating a monitoring system with portable cameras worn by visitors. The portable camera may be brought along with a visitor (e.g., delivery person, maintenance person, dog walker, etc.) to the monitored property. The portable camera may be an image capture device that can capture multiple images in sequence to form a video. The portable camera may include a speaker, a microphone, and may be capable of facilitating audio/video communication. For example, the portable camera may be "worn" by a visitor, for example, by being mounted/integrated to the visitor's jacket, belt, watch, headset, glasses, and etc., to record videos as in the "worn" status. As an example, the portable camera may be a mobile phone that is inserted in a pocket of the visitor's jacket. A control unit or monitoring server of the monitoring system may utilize information about the delivery schedule and the portable camera to supervise access to the monitored property. Accordingly, a home owner may not need to manually provide access to the home for operators using a portable camera. When the visitor is granted access to the monitored property, the portable camera may capture video data which may be communicated to the control unit within the monitoring system, a monitoring server for the property, and a third party server associated with the delivery. In some examples, the video may be directly streamed to an owner of the property using a peer to peer ("P2P") network between the portable camera and a device of the owner of the property. In some examples, the video may be indirectly streamed to the owner via a server that receives the video from the portable camera. The control unit or the server(s) may alert a user associated with the monitoring property of an event of the visitor's unexpected behavior/location based on video analytics or sensor signals.

Figure 1A:
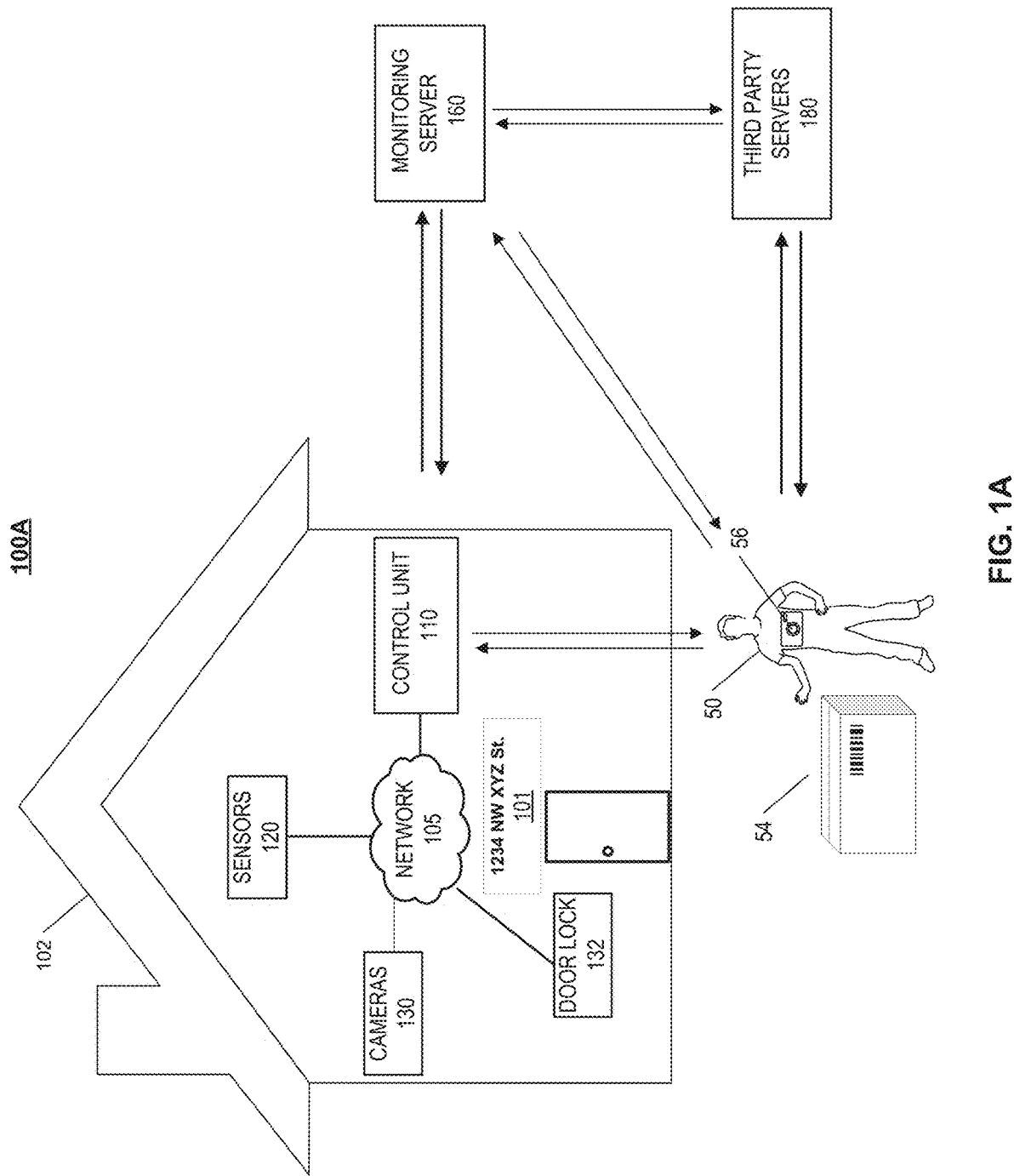
FIG. 1A illustrates a contextual diagram of an example system supervising access with an example portable camera worn on a visitor.

FIG. 1A illustrates an example of a monitoring system 100 integrated with a portable camera 56. For example, a property 102 (e.g., a house) is monitored by a monitoring system (e.g., in-home security system) that includes components that are fixed within the property 102. The monitoring system 100 may include a control unit 110, one or more sensors 120, one or more cameras 130, one or more door locks 132. The control unit 110 may communicate with a remote monitoring server 160 (e.g., central server of in-home security system). The control unit 110 may use data received from the portable camera 56 and the monitoring server 160 to determine whether or not to grant a visitor 50 access to the property 102. The portable camera 56 may communicate with third party servers 180 associated with a delivery at the property 102 to confirm the delivery schedule, update the delivery activities, and send the videos captured by the portable camera 56.

As depicted in FIG. 1A, a visitor 50 (e.g., delivery person) carrying the portable camera 56 arrives at the monitored property 102 to deliver a package 54. In some examples, the visitor 50 may be a maintenance person (e.g., plumber, electrician, handy man, etc.) or a service provider (e.g., baby sitter, dog walker, etc.) who may provide maintenance/service without carrying such a package 54. When the visitor arrives at the property 102, the visitor 50 may inform the control unit 110 that the visitor 50 has arrived at the property 102 using the portable camera 56. Alternatively, or in addition, the control unit 110 may detect the visitor 50 using data from the cameras 130 and sensors 120. For example, the cameras 130 may pan and/or tilt to capture the video and/or image of the visitor 50.

After the control unit 110 has determined that the visitor 50 arrived at the property 102, the control unit 110 may determine whether any delivery or service is scheduled within a time window around the time that the visitor 50 arrives. For example, the control unit 110 may obtain delivery information from the monitoring server 160 that, in some cases, may have received the data from the third party servers 180 such as merchant website servers. The delivery information may include a property address, a delivery time window, a name of the user, a delivery provider, merchandise information, a number of packages, a portable camera assigned to the delivery, etc. The delivery time window (e.g. ±1 hour, ±3 hour) may be preset by the user or the delivery provider so that the control unit 110 can determine whether the arrival time is within the expected time window.

After the control unit 110 confirms that the visitor 50 has arrived at the property 102 within the expected delivery time window, the control unit 110 may perform an encrypted handshake with the portable camera 56 to determine whether the visitor 50 and the portable camera 56 correspond to the delivery schedule based on the data received from the monitoring server 160. For example, the visitor 50 communicates with the control unit 110 using the portable camera 56 that transmits a signal (e.g., a serial number, an identification code) to the control unit 110 to inform that the visitor 50 carrying the portable camera 56 corresponds to the delivery schedule. In some examples where the control unit 110 is provided by a remote server, the property 102 may include a door lock that is controlled by the remote server. In these examples, the portable camera 56 may communicate with the remote server to verify that the portable camera 56 corresponds to the delivery schedule.

In some implementations, the control unit 110 may determine whether the property 102 is in a status to grant access to the visitor 50. For example, when the visitor 50 arrives at the property 102, the monitoring system 100 may have been set to a privacy mode in which no visitor is allowed because, for instance, there may be a dog left out in the property 102, or someone in the property 102 may be in the shower. In some cases, when the control unit 110 determines that one or more components (e.g., cameras 130, sensors 120, other tracking hardware) of the system do not operate or respond to the control unit 110, the visitor 50 would not been allowed to access the property 102. For example, the portable camera 56 or the cameras 130 of the property 102 may not respond to the control unit 110 due to a low battery or the network 105 outage that may disable communication between the components. In these cases, the control unit 110 would not grant permission for the visitor 50 and the portable camera 56 to access the property 102.

In some examples, the visitor 50 may tamper with the portable camera 56 by occluding the field of view of the portable camera 56, for instance. In this case, the control unit 110 may determine that the portable camera 56 does not operate properly based on video analytics with data (e.g., black images) from the portable camera 56 and other data from the cameras 130 and sensors 120. In addition, the control unit 110 may utilize location information of the portable camera 56 which includes a location sensor (e.g., IMU). For example, the control unit 110 may check the operation of the portable camera 56 based on determining that the portable camera 56 is present in a certain range from the property 102 using the location information from the IMU sensor of the portable camera 56.

In some implementations, the portable camera 56 is configured to identify the package 54 and inspect the package 54 by scanning the package 54. For example, the visitor 50 may present the package 54 to the portable camera 56, where the portable camera 56 may capture a video/image of outside of the package 54 and a package label attached to the package 54 that may include an identifying code such as barcodes or quick response (QR) codes, sender information, a delivery address, product IDs, an order number, etc. Based on the captured video/image of the package 54, the control unit 110 may verify that the package 54 matches information from the preset delivery schedule and that the package seal is intact. The control unit 110 may store the recorded video/image of the package 54 and send them to the servers 160, 180 to track the status or damage of the package 54 during the delivery.

In some implementations, the portable camera 56 may be used to visually verify and record that the visitor 50 has correctly arrived at the property 102. For example, the portable camera 56 may be pointed at the street address sign 101, the front door, access panel of the property 102 to capture video/image thereof. This process may be augmented by a location sensor (e.g., GPS), wireless communication with a door hardware, a display on or near the door that can display a code which the portable camera 56 can scan.

For example, the third party servers 180 may track a location of the portable camera 56 based on GPS data to determine that the location of the portable camera 56 corresponds to the delivery address set for the delivery schedule for property 102. The third party servers 180 may communicate with the monitoring server 160 to inform the control unit 110 that the visitor 50 appears to be located at the property 102. Then the control unit 110 may display an encrypted code on an access panel at the door so that the portable camera 56 can scan the code to verify its arrival to the property 102. The encrypted code may be a barcode, numbers, and characters. In some examples, the encrypted code may be emitted as a radio frequency from the access panel, and the portable camera 56 may be moved close to the access panel at the door to verify its arrival. In other examples, the visitor 50 may manually input a code through the access panel, and the control unit 110 verifies the code corresponds to the delivery schedule.

After the control unit verifies the visitor 50 has correctly arrived at the property 102, the control unit 110 may grant access to the visitor 50, control the door lock 132 to unlock the door, and set the system to a special service mode in which the portable camera 56 cooperates with the control unit 110. The portable camera 56 may record and transmit videos/images of the entry processes and delivery activities to provide confirmation to the control unit 110 and/or the servers 160, 180.

The portable camera 56 may capture the completion of the designated task at the proper location. For example, the visitor 50 may perform another package inspection and verification after placing the package 54 at the designated location so that the control unit 110 or the servers 160, 180 may record the package status at the completion of delivery. In some examples, the control unit 110 may communicate the drop-off location recorded by the portable camera 56 to the customer so that the customer may be able to easily locate the package. For example, the visitor 50 may have delivered a document under a mat outside of the front door to prevent it from going missing due to wind. The control unit 110 may provide a recorded video to the customer to assist the customer to find the document under the mat easily. In some examples, the customer may be authorized to replay the video captured by the portable camera 56 during the delivery.

After the visitor 50 has completed the delivery, the control unit 110 may utilize data from the portable camera 56 to determine that the visitor 50 has exited the property 102 and secured the property 102. For example, the visitor 50 may be tasked to point the portable camera 56 at the door or input the encrypted code from the outside to provide proof that the visitor 50 has exited and properly secured the property 102.

The exit verification process may involve a similar handshake process as the original access granting process. For example, the portable camera 56 may transmit a signal to the control unit 110 (e.g., via the servers 160, 180) to inform a completion of the task. Based on the completion signal from the portable camera 56, the control unit 110 may control the door lock 132 to lock the door. The monitoring system 100 may automatically rearm the property 102 after the visitor 50 has left and the door has been secured. The monitoring system 100 may change the special service mode that has set for the delivery/service to a normal monitoring mode.

The monitoring server 160 may store the videos/images captured by the portable camera 56 to enable retrieval and review of the videos/images for a potential dispute resolution. In some examples, the monitoring server 160 may store an audit log of all activities, including the videos/images, to resolve future disputes about the delivery which may be initiated by the customer, the visitor 50, or the employer of the visitor 50. Such audit log may or may not be encrypted. For example, the customer may report a missing delivery through the third party merchant websites or the delivery provider. This missing delivery issue may be resolved quickly by reviewing the recorded video and corresponding event logs that were stored in the monitoring server 160 or the third party servers 180 during the delivery time windows.

In addition, the recorded videos and images may be tagged with various milestones of the process to enable quick review. For instance, the user (e.g., customer, delivery provider) may jump to a video captured at the package drop-off to quickly verify the delivery was complete. For example, the visitor 50 may press a button on the portable camera 56 to indicate that the visitor 50 is about to leave the package on the ground in the property 102 using the portable camera 56. In other examples, the monitoring server 160 may analyze data from the cameras 130 and use object recognition to detect when the visitor 50 places the package 54 on a surface and tag that moment as the package drop-off milestone.

The monitoring server 160 may manage the monitoring application, and may be in communication with one or more other control units from other monitored properties. The monitoring server 160 may receive data from third party servers 180 for the delivery scheduled for the specific property 102. The third party servers 180 may be servers of shipping companies. The third party servers 180 may also include servers of merchant web sites. The monitoring server 160 may access the data received from the third party servers 180 to confirm the visitor 50 and the portable camera 56 are expected. For example, the user may have ordered an item from a product company that was shipped via a delivery company. The third party servers 180 from both the product company and the delivery company would communicate the order information along with the tracking information of the package 54 to the monitoring server 160.

The monitoring server 160 may confirm the package delivery was expected on the given time window based on the information received from the third party servers 180. The monitoring server 160 confirms the visitor 50 is the expected delivery person based on the order information and the tracking information, and communicates the confirmation to the control unit 110. In some examples, the monitoring server 160 may communicate with the portable camera 56 to receive identification information of the portable camera 56, information of the package 54, and the location of the visitor 50 to confirm the visitor 50, the portable camera 56, and the package 54 are expected on the given time window.

Figure 1B:
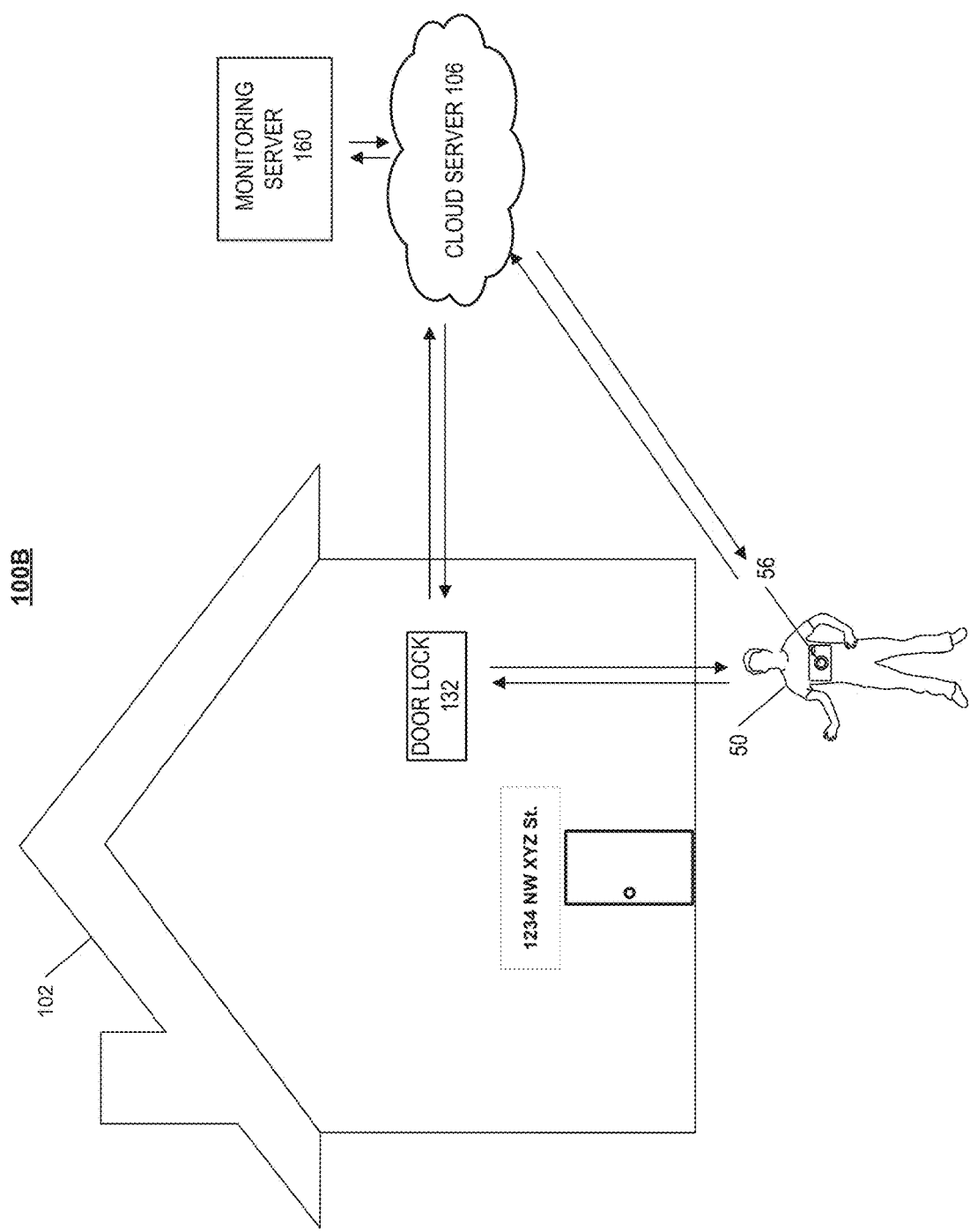
FIG. 1B illustrates a contextual diagram of an example system supervising access with an example portable camera worn on a visitor and an example door lock communicating with an example cloud server.

FIG. 1B illustrates an example system 100A for supervising access with an example portable camera 56 worn on a visitor 50 and an example door lock 132 communicating with an example cloud server 106. For example, the control unit 110 of FIG. 1A may be a virtual unit provided by the cloud server 106 that is remote from the property 102. The cloud server 106 may correspond to a remote server that is independent or separate from the monitoring server 160 and that communicates with the monitoring server 160. In some cases, the cloud server 106 may provide services that are provided by one or both of the monitoring server 160 and the control unit 110 in FIG. 1A.

In some implementations, the door lock 132 may be a connected lock that is internet accessible. In this case, the access control to the property 102 can be implemented with the door lock 132 and the portable camera 56. For example, the door lock 132 may be connected to the Internet and configured to receive the delivery information from the server 160. Based on the received delivery information and an access request from the portable camera 56, the door lock 132 may perform the verification processing to determine whether to grant access to the visitor 50 carrying the portable camera 56. The access request from the portable camera 56 may be received directly from the portable camera 56 coming into short wireless communication range of the door lock 132, or indirectly from the portable camera 56 through the internet after the portable camera 56 obtains an image of something that identifies the door lock 132. In some examples, the door lock 132 may perform the verification processioning using some other mechanisms (e.g., finger pad detection, iris recognition, face recognition) that identify the visitor 50 with the portable camera 56 attempting to obtain access from the door lock 132. In some examples, the door lock 132 may include an access panel or a keypad that the visitor 50 can input a code associated with the scheduled delivery.

Figure 2:
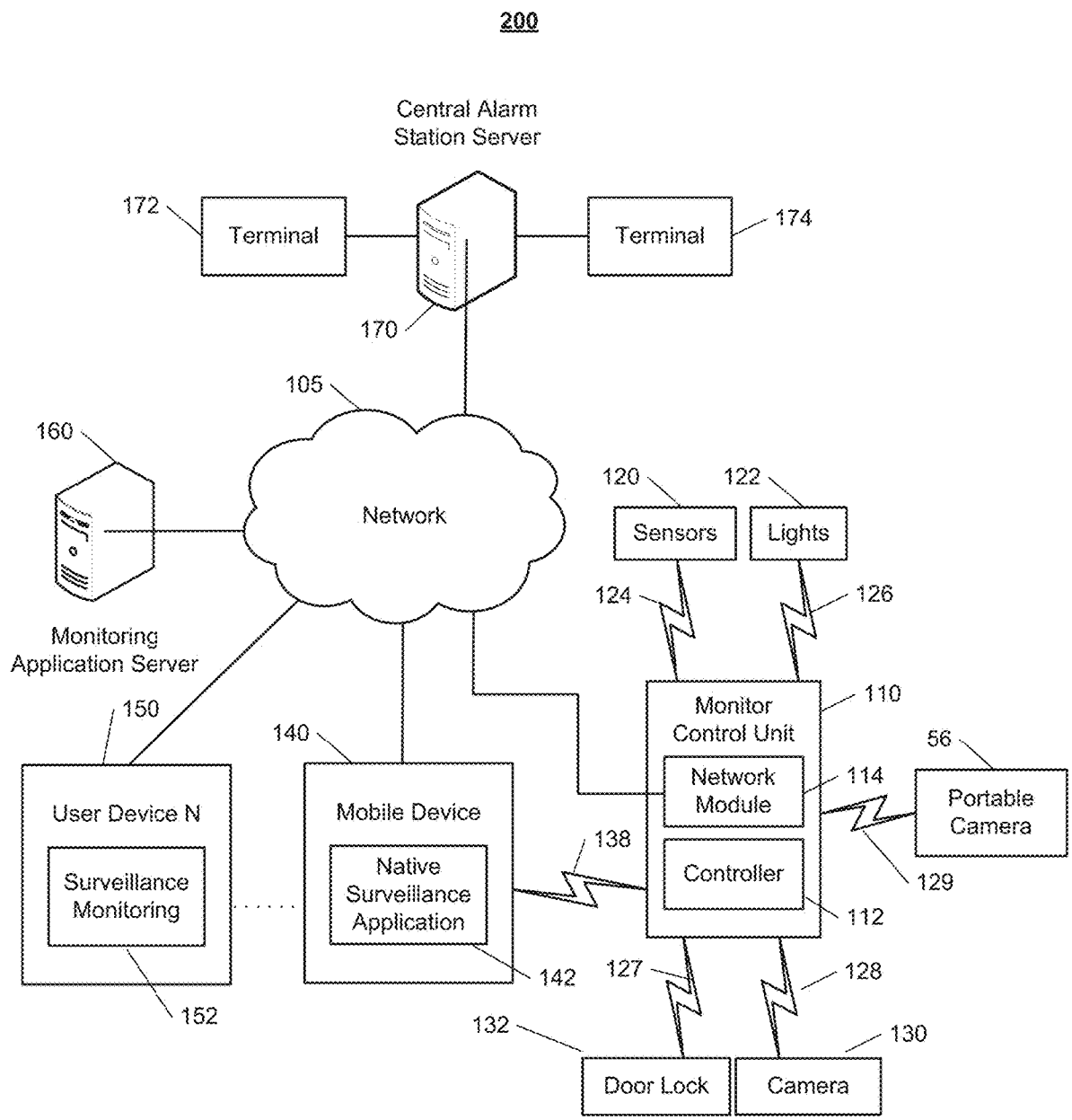
FIG. 2 illustrates an example of a monitoring system integrated with an example portable camera.

FIG. 2 illustrates an example of a system 200 configured to provide surveillance, reporting, and supervising property access. The system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless comunication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring system control unit 110. The camera 130 may employ a small solar cell to recharge the battery when light is available. Alternatively, the camera 130 may be powered by the controller's 112 power supply if the camera 130 is co-located with the controller 112.

In some implementations, one or more of the components of the system 200 (e.g., the monitoring application server 160) may be configured to supervise access to the monitored property 102 when a visitor arrives at the property 102. For instance, the system 200 may control the door lock 132 to permit the visitor to enter the property 102 based on determining that the visit is a known person to the user of the property 102, a scheduled visitor such as a delivery person, or a scheduled service provider. The system 200 may control the camera 130 to monitor the visitor's activities/behaviors while the visitor is outside the property and inside the property.

In some implementations, the system 200 may further include a portable camera 56 that a visitor 50 to the property 102 may wear or carry to facilitate its tasks (e.g., package delivery) at the property 102 and to communicate with the system 200. For example, the portable camera 56 may be a body-worn camera device designed explicitly for the purpose, a headset device with a camera, or a smartphone placed in a pocket of the visitor. The portable camera 56 may be any type of electro-optical (EO) device that can capture an image and/or video. For example, the portable camera 56 may include an EO camera, or be augmented with other assisted sensors, such as inertial measurement unit (IMU) such as compasses, gyroscopes, and accelerometers, optical flow cameras, infrared (IR) cameras, depth sensors, other 3D scanning devices, radio telemetry, GPS, RFID, and etc. which may help to sense the environment or to determine more accurate position of the portable camera 56 and the visitor 50 who wears or carries the portable camera 56 in the environment.

In some examples, the portable camera 56 may include a communication module configured to send the image/video data to the system 200 (e.g., control unit 110) to receive access to the property 102 and to verify its identity. In some cases, the portable camera 56 may communicate with the one or more user devices 140, 150 to receive access to the monitored property 102 and to receive instructions about the tasks at the property 102 as necessary. For example, the user or home owner may guide the visitor 50 to a predesignated location in the property 102. Processing could take place on the portable camera 56, or be shared with networked computing resources located either locally at the property 102 (e.g., control unit 110) or remotely (e.g., servers 160, 170).

The sensors 120, the module 122, the door lock 132, the camera 130, and portable camera 56 communicate with the controller 112 over communication links 124, 126, 127, 128, and 129. The communication links 124, 126, 127, 128, and 129 may be a wired or wireless data pathway configured to transmit signals from the sensors 120, the module 122, the door lock 132, and the camera 130 to the controller 112. The sensors 120, the module 122, the door lock 132, and the camera 130 may continuously transmit sensed values to the controller 112, periodically transmit sensed values to the controller 112, or transmit sensed values to the controller 112 in response to a change in a sensed value.

The communication link 129 over which the portable camera 56 and the controller 112 communicate may include a local network. The portable camera 56 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, or wired Ethernet networks utilizing cables such as Category 5 (CAT5) or Category 6 (CAT6).

The monitoring application server 160 provides monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 provides alarm monitoring service by exchanging communications with the monitoring system control unit 110, the one or more user devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more user devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, the door lock 132, and the camera 130. The one or more user devices 140, 150 receive data directly from the sensors 120, the module 122, the door lock 132, and the camera 130 and sends data directly to the sensors 120, the module 122, the door lock 132, and the camera 130. The one or more user devices 140, 150 provide the appropriate interfaces/processing to provide visual surveillance and reporting.

In other implementations, the system 200 further includes network 105 and the sensors 120, the module 122, the door lock 132, and the camera 130 are configured to communicate sensor and image data to the one or more user devices 140, 150 over network 105 (e.g., the Internet, cellular network, etc.). In yet another implementation, the sensors 120, the module 122, the door lock 132, and the camera 130 (or a component, such as a bridge/router) are intelligent enough to change the communication pathway from a direct local pathway when the one or more user devices 140, 150 are in close physical proximity to the sensors 120, the module 122, the door lock 132, and the camera 130 to a pathway over network 105 when the one or more user devices 140, 150 are farther from the sensors 120, the module 122, the door lock 132, and the camera 130. In some examples, the system leverages GPS information from the one or more user devices 140, 150 to determine whether the one or more user devices 140, 150 are close enough to the sensors 120, the module 122, the door lock 132, and the camera 130 to use the direct local pathway or whether the one or more user devices 140, 150 are far enough from the sensors 120, the module 122, the door lock 132, and the camera 130 that the pathway over network 105 is required. In other examples, the system leverages status communications (e.g., pinging) between the one or more user devices 140, 150 and the sensors 120, the module 122, the door lock 132, and the camera 130 to determine whether communication using the direct local pathway is possible. If communication using the direct local pathway is possible, the one or more user devices 140, 150 communicate with the sensors 120, the module 122, the door lock 132, and the camera 130 using the direct local pathway. If communication using the direct local pathway is not possible, the one or more user devices 140, 150 communicate with the sensors 120, the module 122, the door lock 132, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of supervising property access without having to send image/video data to a separate server separated by a network.

In other implementations, all of the processing described throughout this disclosure may be performed on a remote server (e.g., monitoring application server 160). In these implementations, the monitoring system control panel (or sensors themselves) may send image/video data to the remote server over a network and the remote server may perform all of supervising property access. For instance, the monitoring system control unit 110 sends all captured image/video data to the monitoring application server 160 and the monitoring application server 160 performs the processing of supervising property access.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 110 and the monitoring application server 160.

Figure 3B:
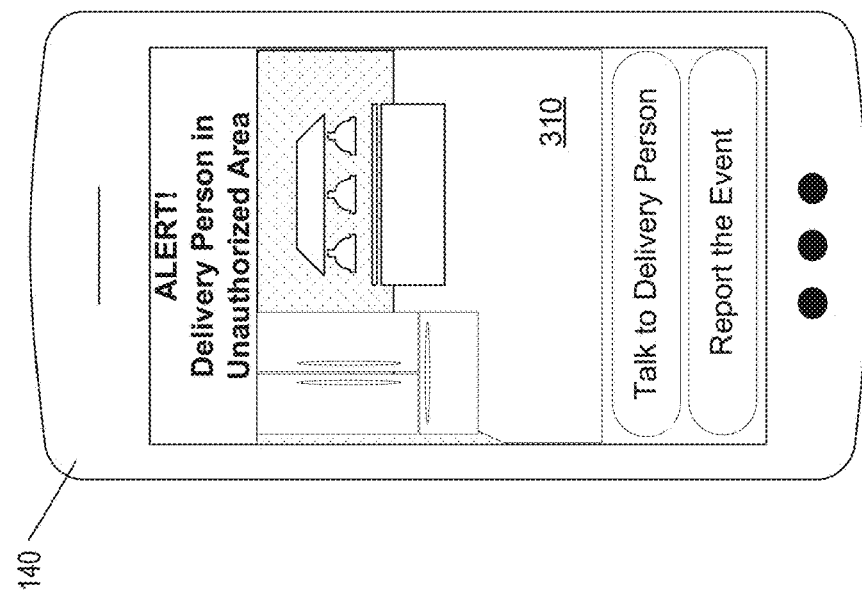
FIG. 3B illustrates an example user interface communicating with the example portable camera in FIG. 3A.
Figure 3A:
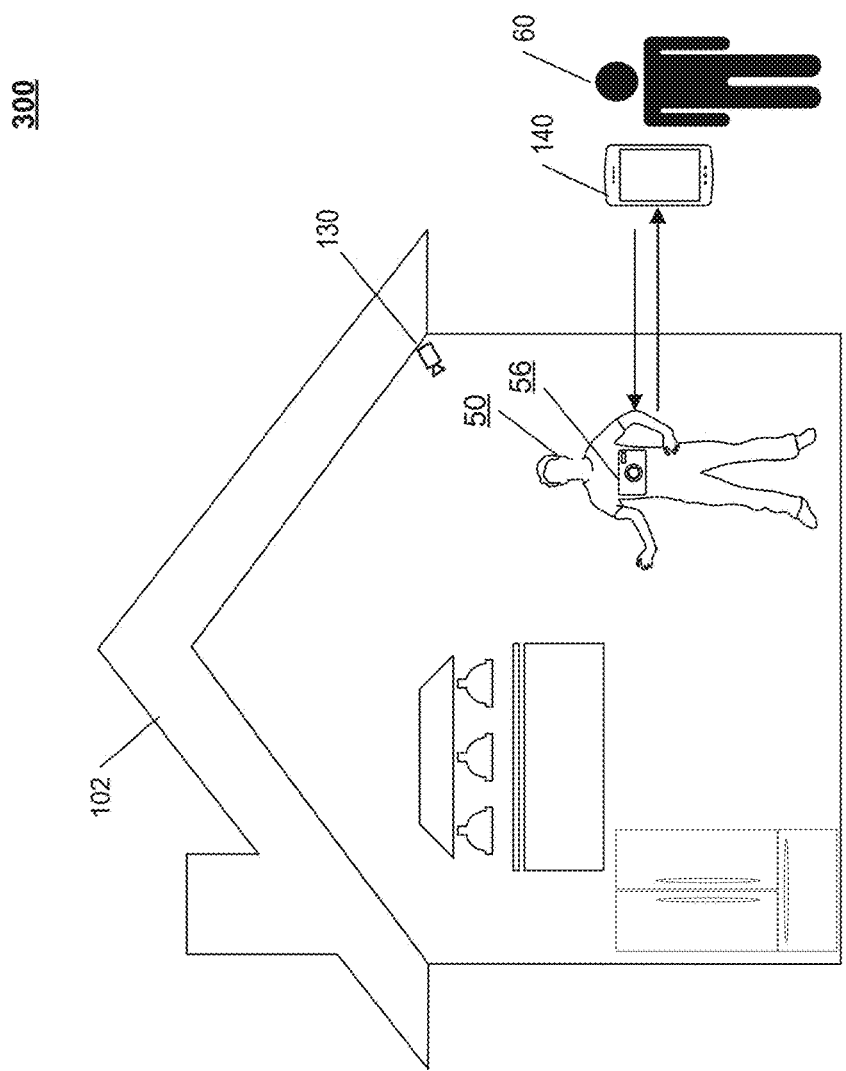
FIG. 3A illustrates a contextual diagram of supervising the visitor in FIG. 1A in a property

FIG. 3A illustrates a visitor 50 inside the property 102. The visitor 50 may be a delivery person who has been granted access to the property 102 via the process described with regard to FIG. 1A. The portable camera 56 that the visitor 50 wears may be capable of performing simultaneous localization and mapping (SLAM) techniques, marker-based tracking, or other visual navigation techniques to track the movements of the visitor 50 inside and/or outside the property 102. For example, the portable camera 56 may be configured to detect objects (e.g. walls, corners, stairs, etc.) of the property 102, determine distances of the detected objects from the portable camera 56, and determine a relative location of the portable camera 56 at the property 102 with respect to the detected objects.

In examples where the monitoring system 100 has established a 3D map of inside and outside the property 102, the monitoring system 100 may determine a location of the visitor 50 in the 3D map based on the video/images from the portable camera 56 or the cameras 130 or signals from other sensors 120 such as passive infrared (PIR) sensors and IMU sensors. Fiducial markers may be used to explicitly designate goals, waypoints, or off limits areas, and the portable camera 56 may aid the visitor 50 in identifying these. For example, the fiducial markers may be a shape, a combination of shapes, or a pattern that the portable cameras 56 can detect to determine its relative location, designate goals, waypoints, or off limits areas.

In some implementations, the portable camera 56 may be used to guide the visitor 50 to a designated location for the necessary service or service. For example, the portable camera 56 may provide navigation and guidance to the visitor 50 via visual, haptic, or auditory cues. For example, the portable camera 56 may emit a flashing light, vibrate, or make a sound with a variable frequency that changes as the visitor 50 becomes closer to the predesignated goal. In some cases, the visitor 50 may also request guidance or clarification to the control unit 110, the employer of the visitor 50, the customer, or their surrogates. For example, the portable camera 56 is capable of two-way audio communication and one-way video communication with a third party (e.g., the customer) to receive guidance for the visitor 50 to find the designated location. By the guidance from the customer, the visitor 50 may be instructed, via the portable camera 56, to leave a package in a certain place and record the location.

FIG. 3B illustrates an example user interface of the user device 140 of the customer 60. For example, the control unit 110 or the portable camera 56 may notify the employer of the visitor 50, the customer 60, or their surrogates if the visitor 50 strays from the predesignated path. In some examples, the control unit 110 may trigger a security event if the visitor 50 strays from the predesignated path for a predetermined period of time (e.g. 10 sec, 30 sec, 1 min). For example, the control unit 110 detects the visitor 50 in the kitchen area of the property 102, which is not listed as an authorized location for the scheduled delivery. Based on the detection of the visitor 50 in the unauthorized location, the control unit 110 may send an alert message along with the image/video captured by the portable camera 56/camera 130 to the user device 140 of the customer 60. The customer 60 may attempt to communicate with the visitor 50 to guide the visitor back to the designated location or give further guidance while viewing the video sent by the portable camera 56. If the visitor 50 appears to attempt a security breach, the customer 60 may report the event to the central alarm station server 170 through the user interface.

Figure 4:
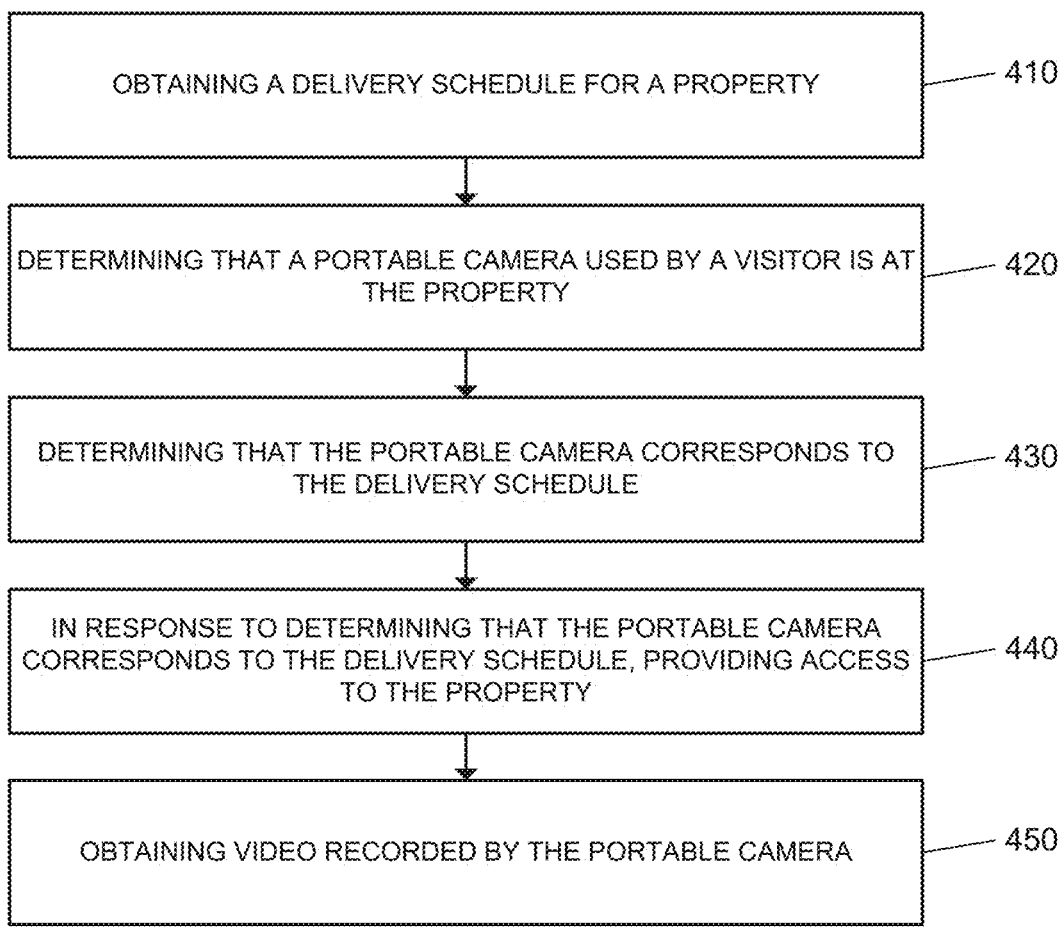
FIG. 4 is a flow chart of an example process for monitoring a visitor with an example portable camera.

FIG. 4 illustrates an example process 400 for supervising property access utilizing a portable camera 56. The process 400 may be implemented as a computer-implemented method that includes obtaining a delivery schedule for a property (410), determining that a portable camera used by a visitor is at the property (420), determining that the portable camera corresponds to the delivery schedule (430), in response to determining that the portable camera corresponds to the delivery schedule, providing access to the property (440), and obtaining a video recorded by the portable camera (450). Although the example process 400 is described with respect to supervising access to a property for a delivery task, a process, which is the same as or similar to the process 400, may be applied to supervising access to a property for various other tasks including but not limited to delivery/maintenance/service tasks for the property.

For example, the monitoring system 100 (e.g., control unit 110) receives a delivery schedule for the monitored property 102 from the monitoring server 160 and/or from the third party servers 180 (410). In some implementations, the monitoring server 160 may receive the delivery schedule from the third party servers 180. The delivery schedule may include information about a visitor 50 and the portable camera 56 such as an identification number. In some examples, the portable camera 56 may have been assigned to an identification code. In some examples, the delivery schedule may further include data corresponding to a delivery task for the property 102 such as an address of the property 102, an expected time window of the visitor 50, and expected identification codes of portable camera(s) assigned to the delivery task for the property 102.

The control unit 110 determines that the portable camera 56 used by the visitor 50 is at the property 102 (420). The control unit 110 may utilize a signal from the portable camera 56 to determine that the visitor 50 carrying the portable camera 56 arrives at the property 102. In some examples, the portable camera 56 may communicate with the control unit 110 via the servers 160, 180 to inform the control unit 110 of its arrival. In some implementations, the control unit 110 obtains a signal from the portable camera 56, where the signal indicates a least one of a location of the portable camera 56 (e.g., a GPS signal), an identification code of the portable camera 56, an access code for the property 102, or an image of an area of the property 102.

For example, the identification code of the portable camera 56 may be a number or a pattern that the control unit 110 can detect using a sensor 120 or a camera 130. An access code for the property 102 may be a number or a pattern that the control unit 110 can detect using the sensor 120 or the camera 130. The access code for the property 102 may be transferred to the portable camera 56 before or after the visitor 50 arrives at the property 102. For example, the access code may be transferred to the portable camera 56 when the delivery schedule is created. In some examples, the access code may be transferred to the portable camera 56 once the visitor 50 arrives at the property 102.

In some examples, when the visitor 50 arrives at the property 102, the visitor 50 may present the portable camera 56 to the sensor 120 or the camera 130 of the property 102 so that the control unit 110 can obtain the identification code of the portable camera 56 or the access code that the portable camera 56 has received. In some examples, the portable camera 56 includes a GPS signal transmitter, and the control unit 110 may obtain a GPS signal from the portable camera 56 that indicates a location of the portable camera 56.

The control unit 110 then may determine whether the signal received from the portable camera 56 corresponds to the delivery schedule for the property 102. For example, the control unit 110 may compare the signal (e.g., information included in the signal) with information included in the delivery schedule for the property 102. As one example, the GPS signal received from the portable camera 56 may be compared with the address of the property 102 included in the delivery schedule. In another, the identification code of the portable camera 56 may be compared with the expected identification codes assigned to the delivery task for the property 102.

In some implementations, the control unit 110 may receive an image captured by the portable camera 56 to determine the portable camera 56 is at the property 102. For example, the portable camera 56 may capture an image of an area of the property 102, which includes an address plaque of the property 102, a front door of the property 102, or a street name sign, and send the image to the control unit 110. The control unit 110 may include reference images of various areas of the property 102, and compare the image received from the portable camera 56 with the reference images to determine that the image received from the portable camera 56 corresponds to one or more of the reference images of the property 102.

In some implementations, the control unit 110 may obtain an image from at least one of the portable camera 56 or a camera 130 installed at the property 102 to determine the portable camera 56 used by the visitor is at the property 102. For example, based on a time instant that the image has been taken, the control unit 110 may determine an arrival time of the visitor 50 corresponding to the image obtained from at least one of the portable camera 56 or the camera 130 installed at the property 102.

In some implementations, multiple signals may be used to determine that the portable camera 56 used by the visitor 50 is at the property 102. For instance, the control unit 110 may receive, from the portable camera 56, two or more of a GPS signal, an image of the property 102, an identification code of the portable camera 56, an access code for the property 102, and an arrival time at the property 102. In some cases, the control unit 110 may receive a signal (e.g., a GPS signal, a clock data bit, etc.) other than an image, which includes a time instant, and set the time instant as an arrival time of the visitor 50 at the property 102.

The control unit 110 then determine whether the arrival time is within an expected time window of the visitor based on the delivery schedule for the property 102, for example, by comparing the arrival time to the expected time window. The control unit 110 may determine, based on a determination that the arrival time is within the expected time window of the visitor, that the portable camera 56 used by the visitor 50 is at the property 102. In some cases, the control unit 110 may also determine, based on the determination that the arrival time is within the expected time window of the visitor 50, that the portable camera 56 corresponds to the delivery schedule.

The control unit 110 determines that the portable camera 56 at the property 102 corresponds to the delivery schedule (430). For example, the control unit 110 may obtain a signal from the portable camera 56 that indicates an identification code of the portable camera 56. As describe above, the delivery schedule may include one or more expected identification codes of one or more portable cameras assigned to the delivery task for the property 102. The control unit 110 may determine one or more expected identification codes included in the delivery schedule. In one example, the portable camera 56 may transmit the identification code to the control unit 110, the sensors 120, or the cameras 130.

In some examples, the control unit 110 may receive an image of the visitor 50, the package 54, or a delivery vehicle at the property 102, and determine one or more expected identification codes of one or more portable cameras assigned to the delivery task based on the image. For instance, a delivery service provider may be assigned to a specific identification code, and the control unit 110 may identify the delivery service provider based on the image of the visitor 50, the package 54, or the delivery vehicle at the property 102. In some implementations, the system 100 may include a recognition model such as a trained facial recognition model or a trained vehicle recognition model to determine that the portable camera 56 at the property 102 corresponds to the delivery schedule. For example, the recognition model may include a neural network that is trained to classify or recognize objects such as humans, animals, vehicles, or text. In some examples, the recognition model may also include an optical character recognition (OCR) function to recognize characters included in an image of the visitor 50, an image of the package 54, or an image of a vehicle that the visitor 50 rode to the property 102. The system 100 may utilize the neural network, the OCR function, or a combination of the neural network and the OCR function to identify a location of the visitor 50 based on the image.

The control unit 110 may then determine whether the identification code of the portable camera 56 matches one of the expected identification codes. For example, the control unit 110 may compare the identification code received from the portable camera 56 to the one or more expected identification codes of the portable cameras assigned to the delivery schedule. The control unit 110 may determine, based on a determination that the identification code of the portable camera matches one of the expected identification codes, that the portable camera 56 corresponds to the delivery schedule.

In some implementations, the control unit 110 may determine, based on the signal received from the portable camera 56, one or both of that the portable camera 56 used by the visitor 50 is at the property 102 and that the portable camera 56 corresponds to the delivery schedule. For example, the control unit 110 may determine, based on a determination that the signal corresponds to the delivery schedule for the property 102, that the portable camera 56 used by the visitor 50 is at the property 102. In some implementations, the control unit 110 may determine that the detected portable camera 56 corresponds to the delivery schedule based on reception of the signals from the portable camera 56 as described above at 420.

In response to determining that the portable camera 56 corresponds to the delivery schedule, the control unit 110 provides the visitor 50 with access to the property 102 for the visitor 50 to perform a scheduled task (440) at the property 102. For example, the visitor 50 may be tasked to deliver fresh vegetables and store them in customer's refrigerator in the property 102. In examples where the package 54 includes high value items, the customer may designate a delivery location to a location inside the property 102. The control unit 110 unlocks the door lock 132 to allow the visitor 50 to enter the property 102 to complete the scheduled task inside the property 102. In some cases, the control unit 110 may send a message/signal to the visitor 50 or play a sound to indicate the access granted. In other cases, a keypad of the property 102 may indicate the access granted, for example, by showing a green indication light.

In some implementations, the control unit 110 may determine an operation status of the portable camera 56 based on the video recorded by the portable camera 56 before providing access to the property 102. For instance, the control unit 110 may determine whether the portable camera 56 is occluded based on the video recorded by the portable camera 56. If the visitor 50 or some other object (e.g., a cover of the portable camera 56) blocks the portable camera 56, the video recorded by the portable camera 56 may include a black image or blank pixels. In this example, the control unit 110 may determine that the portable camera 56 is not in a normal status, and may not provide access to the property 102.

In some examples, the control unit 110 may utilize a signal from the portable camera 56 to determine the normal status. For example, the control unit 110 may receive an IMU signal that represents motion of the portable camera 56. The control unit 110 may then determine a motion of the portable camera 56 based on a video captured by the portable camera 56 to determine whether the motion of the portable camera 56 based on the video corresponds to the IMU signal of the portable camera 56. If the IMU signal does not correspond to the motion of the portable camera 56 based on the video, the control unit 110 may determine that that the portable camera 56 is not in a normal status. In this case, the image from the portable camera 56 is not necessarily blacked out, but the portable camera 56 may be in an abnormal status.

In some examples, the control unit 110 may determine whether the portable camera 56 communicates with a monitoring system of the property 102. For instance, the control unit 110 may determine whether the portable camera 56 communicates with the monitoring server 160 based on reception of the video from the portable camera 56. If the monitoring server 160 receives a video from the portable camera 56, and the received video corresponds to the property 102, the control unit 110 may provide access to the property 102. If the control unit 110 or the monitoring server 160 does not receive a video from the portable camera 56, the control unit 110 may determine that the portable camera 56 is not in a normal status, and may not provide access to the property 102.

In some examples, the control unit 110 may determine operation status of a component of the monitoring system of the property 102 before providing access to the property 102. For example, the control unit 110 may determine operation status any of the cameras 130, the sensors 120, the network 105, or other components of the monitoring system 100 before providing access to the property 102. In some implementations, the control unit 110 may determine whether the components of the monitoring system 100 receive power greater than a reference power level, whether the cameras 130 capture an image of the visitor 50, whether the sensors 120 detect the visitor 50, or whether the network 105 enables communications of signals between the components.

In some implementations, the control unit 110 may unlock a door (e.g., the door lock 132) of the property 102 based on a determination that the operation status of the portable camera 56 corresponds to a normal status. For example, the control unit 110 may determine the operation status based on reception of a flag (e.g., a data bit) or a signal that indicates a normal status of the component of the monitoring system 100 and the portable camera 56. In some examples, the control unit 110 may receive a battery power level of the portable camera 56, and determine an operations status of the portable camera 56 based on the battery power level. The normal status may correspond to when the portable camera 56 has a battery power level that is greater than a threshold level (e.g., 20% of a full power level) with which the portable camera 56 can record and transmit a video for a predetermined duration to complete an assigned task. In some cases, the control unit 110 may determine the normal status of the component of the monitoring system 100 based whether the property 102 is in an armed status or a disarmed status. For instance, an armed status may correspond to the normal status, the control unit 110 may provide access to the property 102.

The control unit 110 obtains video/images recorded by the portable camera 56 (450). In one example, the portable camera 56 may be activated all the time so that servers 180 of shipping companies may monitor delivery activities of the visitor 50 using the portable camera 56. In some implementations, in response to granting access to visitor 50, the control unit 110 may receive permission to obtain video/image captured by the portable camera 56 while the visitor 50 is at the property 102 to perform the scheduled task until the visitor 50 leaves the property 102 after completion of the task. In some examples, the portable camera 56 may be activated when the control unit 110 determines that the portable camera 56 corresponds to the preset delivery schedule, and deactivated when the visitor 50 leaves the property 102. In some cases, the visitor 50 may manually activate/deactivate the portable camera 56.

In some implementations, the control unit 110 may obtain one or more images that include a package 54 and an area of the property 102 at which the package 54 is located. For example, the visitor 50 may take one or more images of the package 54 at a front door mat of the property 102 using the portable camera 56 to indicate a status of the package 54 inspected at delivery and a drop-off location of the package. The control unit 110 may determine, based on the one or more images of the package 54 and the area of the property 102, that the package 54 corresponds to the delivery schedule for the property 102. For instance, the control unit 110 may compare bar codes of the package 54 included in the one or more images to the delivery schedule to confirm that the package 54 is delivered as scheduled. This check may be performed in addition to a prior check step that may have been performed before the visitor 50 received access to the property 102.

The control unit 110 may update, based on a determination that the package 54 corresponds to the delivery schedule for the property 102, a delivery status of the package including a drop-off location of the package corresponding to the area of the property 102. In some examples, one or more of the portable camera 56, the control unit 110, and the monitoring server 160 may provide the one or more images to the third party servers 180 to update the delivery status. The control unit 110 may then determine a completion of delivery based on the delivery status of the package including the drop-off location of the package. For example, the control unit 110 determines a completion of delivery if the bar codes of the package 54 matches the delivery schedule, and the package 54 is delivered to a designated location as in the delivery schedule.

In some implementations, the control unit 110 may determine an exit of the visitor 50 from the property 102 based on the video recorded by the portable camera. For instance, the visitor 50 may orient the portable camera 56 toward a front door or an address panel of the property 102 to record a video after exiting the property 102. When the control unit 110 receives the video from the portable camera 56, the control unit 110 determines that the visitor 50 has exited the property 102. Alternatively or in addition, the control unit 110 may determine an exit of the visitor 50 based on a video recorded by the cameras 130 installed at the property 102. The control unit 110 may lock, based on the completion of delivery and the exit of the visitor, a door of the property 102. For example, the control unit 110 may transmit a control signal to the door lock 132 through the network 105 to lock the door of the property 102.

In some implementations, the sensors 120 may include a door sensor that is configured to detect opening and closing of the door or locking and unlocking of the door. The control unit may utilize a signal from the door sensor to confirm the visitor 50 is outside of the property and the door has been closed or locked. For example, the door sensor may transmit a signal that indicates a door bolt is positively engaged to a coupling mechanism that is configured to receive the door bolt.

In some implementations, the delivery schedule may include a time interval allowed for the delivery task as well as an expected arrival time of the visitor 50. For example, the delivery schedule may specify a time interval of six minutes to complete the delivery task. The control unit 110 may determine an elapsed time from a first time point when the door is unlocked to grant access to the visitor 50 to a second time point when the door is locked after the visitor 50 exits the property 102. In some examples, the system 100 may monitor the visitor 50 at the property 102 and track the elapsed time is within the allowed time interval. The system 100 may provide a notification to a user of the property 102 based on the elapsed time being greater than or equal to the allowed time interval, which may indicate a potential intrusion or a problem that the visitor 50 may have in performing the delivery task within the allowed time.

In some implementations, the system 100 may transmit a notification to the visitor 50 when the elapsed time approaches the allowed time interval. In some cases, the visitor 50 may request an extension of time using the portable camera 56. For instance, the portable camera 56 may transmit a request (e.g., a text message, a voice call, an application-based alert seen in FIG. 3B) to a user of the property 102, and the user of the property 102 may determine, in response to the request, whether the system 100 should grant additional time for the visitor 50 to complete the delivery task. In some examples, the user of the property 102 may provide guidance to the visitor 50 in response to the request received from the portable camera 56.

In some implementations, the control unit 110 may obtain the video from the portable camera 56 until the completion of delivery and the exit of the visitor 50. The control unit 110 may stop receiving a new video from the portable camera 56 based on the completion of delivery and the exit of the visitor 50. For example, the control unit 110 may disconnect a communication channel to the portable camera 56 based on the completion of delivery and the exit of the visitor 50. In some cases, the visitor 50 may manually turn off the portable camera 56 to stop transmitting a new video to the control unit 110.

In some implementations, when the visitor 50 arrives at a property 102, the control unit 110 may utilize data from the cameras 130 of the property 102 to perform analytics such as, object recognition, shape recognition, facial recognition, and etc., to determine the visitor 50 corresponds to the one has been authorized for the delivery schedule. For example, the cameras 130 may capture the video and/or image of the visitor 50, the package 54, the portable camera 56, any logos associated with the visitor 50, and a delivery truck parked in front of the property 102. The control unit 110 receives the video and/or image data captured by the cameras 130, and determines the visitor 50 and the portable camera 56 correspond to the one associated with the preset delivery schedule.

In examples where the visitor 50 initiates communication with the control unit 110 upon arrival at the property 102, the visitor may utilize a user interfaces such as a keypad, a mobile phone, a package scanner, the portable camera 56. The user interfaces may be provided at the property 102, or brought by the visitor 50. For example, when the visitor 50 inputs a reference code assigned to the delivery via the keypad at the property 102, the control unit 110 may determine whether a delivery has been scheduled based on the received reference code, and if so, provide the visitor 50 access to them home.

In some implementations, the control unit 110 may send a notification to a user (e.g. home owner) to notify the user that a visitor is granted access to the property 102. In examples where the control unit 110 receives package information from the monitoring server 160 or the third party servers 180, the notification may include details of the sender of the package and the package delivery time. In some examples, the monitoring server 160 or the third party servers 180 may send the notification to the user based on information received from the control unit 110.

In some implementations, the monitoring system 100 is configured to log steps of the supervising access process either locally in the control unit 110 or remotely in the monitoring server 160 and/or the third party servers 180 for automatic logging and validation. The logged data may be sent to the employer of the visitor 50 and/or the customer or their surrogates for the purposes of manual confirmation and acknowledgement of the delivery or service. In some examples, the data is communicated and stored using cryptographic techniques to prevent tampering of the data and unauthorized access to the data, and to authenticate the identities of necessary actors.

Figure 5:
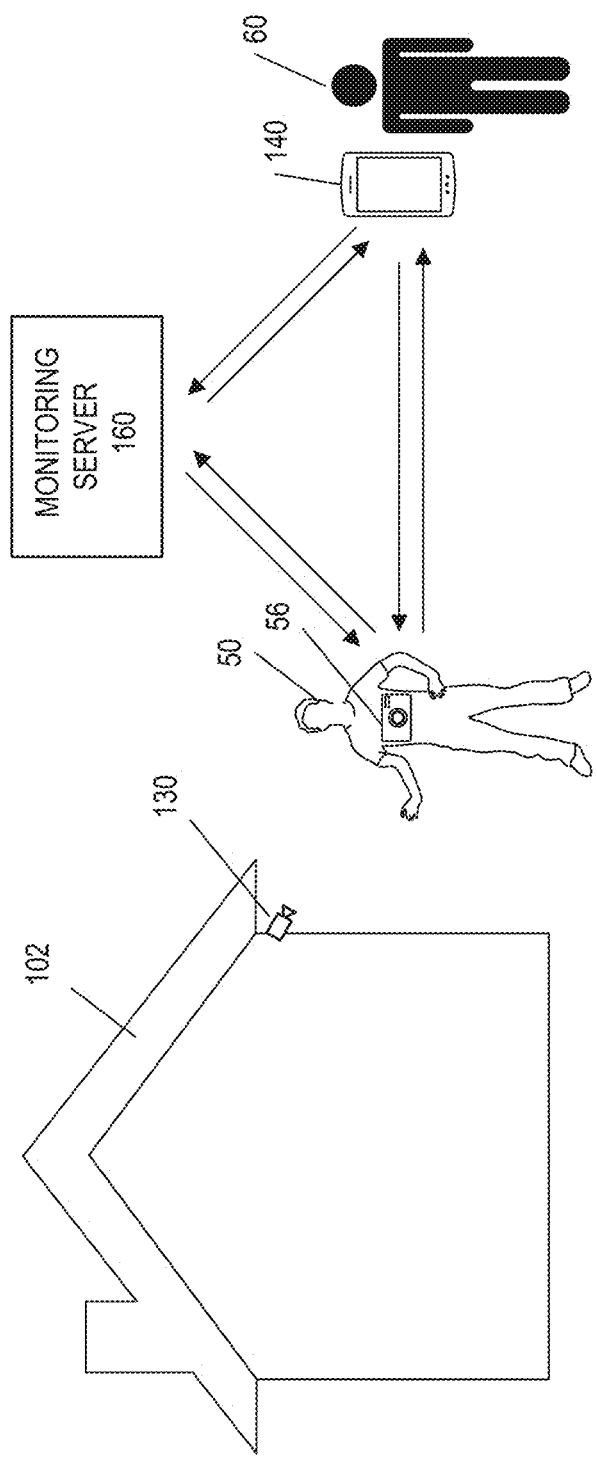
FIG. 5 illustrates a contextual diagram of a two-way communication between a visitor and an owner of a property.

FIG. 5 illustrates an example of establishing communication between a visitor 50 at a property 102 and a customer 60 that may be located remotely from the property 102. The communication includes a two-way audio/video communication in which the visitor 50 and the customer 60 may send and receive information including voices, sounds, images, videos, or any combination thereof. For example, the visitor 50 may carry a portable camera 56 such as a body-worn camera or a mobile phone, and the customer 60 may utilize a user device 140 to communicate with the portable camera 56 carried by the visitor 50. A monitoring server 160 that controls a monitoring system of the property 102 may authorize the visitor 50 to access the property 102 and enable the two-way audio/video communication between the portable camera 56 and the user device 140.

The visitor 50 may request an access to the property upon arrival, and the monitoring server 160 may include a response instruction associated with the access request. For example, the response instruction may include an instruction to set the monitoring system to an assistance mode. In the assistance mode, the property 102 may be disarmed for the visitor 50 to enter an area of the property 102, and a two-way communication between the portable camera 56 and the user device 140 may be enabled or ready to provide assistance in response to an assistance request from the visitor 50. For instance, the portable camera 56 may display an assistance request button that is selectable in a native application of the portable camera 56.

The customer 60 may configure a response instruction for a scheduled visit or a category representing a type of task (e.g., delivery, dog walk, maintenance, yard work, undefined). For example, the customer 60 may set up a contact method (e.g., voice call, text message) and contact information (e.g., phone numbers) to receive an assistance request from the visitor 50 and to provide the visitor 50 assistance. In some examples, the monitoring server 160 may transmit a notification to the user device 140 based on the contact method/information to indicate that the monitoring system of the property 102 is set to an assistance mode for the visitor 50. In some examples, the user device 140 may display a guidance button that is selectable in a native application of the user device 140 to initiate guidance to the visitor 50.

In some examples, the monitoring server 160 may provide the customer 60 with a detail about an assistance request such as the property involved, an identity of the visitor 50, a current location of the visitor 50 at the property 102, an image/video of the visitor 50 taken upon entering the property 102. In some cases, the customer 60 may be provided with an option to accept, decline, or forward the assistance request from the visitor 50, or to send an automated message such as "I will be with you in a moment" to the visitor 50.

In some implementations, the assistance mode may be initiated based on events that the customer 60 may have defined. For example, the assistance mode may be initiated by activities of the visitor 50 at the property 102 such as entering an area (e.g., front porch) of the property 102 or opening a door (e.g., back yard door) that may be detected by a sensor (e.g., camera 130, motion sensor) installed at the property 102. In other examples, the visitor 50 may initiate the assistance mode using a native application or a website accessible from the portable camera 56, a voice command to microphones installed at the property 102, an alarm panel or a door bell of the property 102, or other hardware such as a button on the portable camera 56.

In some implementations, the assistance mode may be initiated based on a disarm code or other methods for disarming the monitoring system of the property 102. For example, the property 102 may include an input panel (e.g., buttons, a touch pad, an electric signal scanner, or a face detector, etc.) that is configured to receive the disarm code from the visitor 50 user or from the portable camera 56. The disarm code may include an encrypted code, alphanumeric character(s), a barcode, an electric signal, a pattern of physical pressure, and a fingerprint, and an iris pattern, etc. that can verify an identity of the visitor 50 and that may be associated with the task assigned to the visitor 50.

In some implementations, both of the visitor 50 and the customer 60 may receive a notification that indicates an assistance mode is established. For instance, when the monitoring system of the property 102 is set to the assistance mode, the visitor 50 may receive a notification on the portable camera 56 or a mobile device carried by the visitor 50, and the customer 60 may also receive a notification on the user device 140. In some cases, an output device (e.g., display, speaker) of the monitoring system installed at the property 102 may provide the notification to the visitor 50 when the assistance mode is established.

In some examples, the customer 60 may receive a live video stream taken by the portable camera 56 through the user device 140 if the visitor 50 has agreed to provide the customer 60 with images and videos taken at the property 102 while the visitor 50 is at the property 102 to perform a task. In other examples, the customer 60 may request the visitor 50 to send a video taken by the portable camera 56, and the visitor 50 may send the video captured by the portable camera 56 in response to the request from the customer 60. The video may be a live video stream or a recorded video that the visitor 50 has taken to capture an event related to the task (e.g., dropping off a package). In some examples, the visitor 50 may send an image or video taken by the portable camera 56 to show the customer 60 an issue that may not be captured by a camera 130 installed at the property 102. For example, the visitor 50 may record and send the customer 60 a video of a plumbing work that the visitor 50 performed at an area (e.g., under a sink) outside a field of view of the camera 130 installed at the property 102.

In some examples, the customer 60 may send the visitor 50 an image, video, or document using the user device 140 to assist the visitor 50 to resolve an issue that the visitor 50 encounters for performing a task at the property 102. For example, the visitor 50 may have a task to store fruits in a refrigerator, but find the refrigerator is full. In this case, the visitor 50 may request an assistance through the portable camera 56, and the customer 60 may guide the visitor 50 by talking to the visitor 50 using the user device 140 or by sending the visitor 50 an image or a map of an alternative storage location at the property 102 or a video showing a path to the alternative storage location.

In some implementations, in addition to enabling communication between the visitor 50 and the customer 60, the monitoring server 160 may provide the customer 60 with a status view of the property 102 including a data related to a current position of the visitor 50 at the property 102, any error conditions of the monitoring system, and a live video or an image from a camera 130 located closest to the current position of the visitor 50. The status view of the 102 provided by the monitoring server 160 may help the customer 60 to provide guidance to the visitor 50. For example, the visitor 50 may be lost in the property 102 and request an assistance to the customer 60 to find a way to a correct location to perform a scheduled task. In this case, the customer 60 may determine the current location of the visitor 50 based on the status view of the property 102 and guide the visitor 50 from the current location of the visitor 50 to the correct location. The customer 60 may receive a video stream from the portable camera 56 and the camera 130 installed at the property 102 to monitor the visitor 50 while guiding the visitor 50 to the correct location.

In some implementations, when the monitoring system is in an assistance mode, the monitoring server 160 may allow the customer 60 to remotely activate home automation components to assist a task that the visitor 50 is planned to perform at the property 102. For example, the customer 60 may turn on lights installed at the property 102 to illuminate an area where the visitor 50 is to perform the task or a path that the visitor is to follow to get to the area. The customer 60 may direct the visitor 50 to the area by flashing the lights or playing a sound using a speaker system at the property 102. In other examples, the customer 60, using the user device 140, may open a garage door for the visitor 50 to perform a maintenance task on a water heater in the garage, turn off a sprinkler for the visitor 50 to perform a yard work, or open window blinds and shades for the visitor 50.

In some examples, the visitor 50 may request permission for an access to the home automation components to control the home automation components that are related to a task at the property 102. The customer 60 or the monitoring server 160 may grant permission to the visitor 50 for a temporary control of the home automation components. The temporary control may end based on determining that the visitor 50 finishes the task or leaves the property 102. For example, a native application of the portable camera 56 may display selectable buttons corresponding to the home automation components upon receiving permission from the customer 60, and change the buttons to be unelectable upon detecting the visitor 50 leaving the property 102. In other examples, the visitor 50 may be allowed to control the home automation components by speaking to a voice-control device located at the property 102.

In some implementations, the home automation components may be automatically activated when the monitoring system enters the assistance mode. In examples where the monitoring server 160 tracks a location of the visitor 50 at the property 102, the monitoring server 160 may temporarily activate a portion of home automation components (e.g., lights) that are located within a range from the location of the visitor 50 and deactivate the portion of home automation components when the visitor 50 leaves the location.

In some implementations, the assistance for the visitor 50 using a two-way audio/video communication may be enhanced by an augmented reality technique. For instance, the user device 140 may receive a user input (e.g., touch input) on an image or video displayed on the user device 140 that indicates a location or an object at the property 102. The user input may be overlaid onto to the image or video as a visualization on the user device 140. The portable camera 56 or a mobile device of the visitor 50 may receive information about the object corresponding to the user input and visualize the user input overlaid onto a live video of a location at the property 102 that corresponds to the user input. The information about the object may include a shape of the object, a size of the object, and coordinates of the object.

For example, the customer 60 may draw a mark on an image or video of a room to show a location where the customer 60 wants a piece of furniture placed. The portable camera 56 may receive information about the mark including coordinates of the mark in a reference frame of the user device 140. The portable camera 56 may display a visualization of the piece of furniture overlaid onto a video of the room on the portable camera 56 when the visitor 50 views the room using the portable camera 56. The coordinates of the mark may be translated to second coordinates with respect to a second reference frame when the portable camera 56 displays the visualization overlaid on the video of the room at a location corresponding to the location of the user input on the user device 140.

In some implementations, the system may be configured to allow assistance from someone other than the customer 60 or the owner of the property 102. For example, the system may enable a two-way communication between the visitor 50 and a third party advisor such as another representative of a company related to the visitor 50, a translator, or a vendor, etc. that can assist a task of the visitor 50 at the property 102. In some examples, the third party advisor may be a technician who worked at the property 102 in the past or has knowledge about the property 102.

In some examples, the customer 60 may preset a response instruction for the monitoring server 160 to grant permission for the two-way communication with one or more of third party advisors. For example, the customer 60 may set up a group permission for a delivery company to grant a delivery person from the delivery company to access the property 102 and communicate another representative of the delivery company in case there is an issue or question at the property 102. In this example, a new delivery person may consult another representative of the delivery company, who has serviced the property 102, to locate a correction drop-off location.

In some examples, a native application of the portable camera 56 or a voice-control device at the property 102 may provide the visitor with a list of contacts that the customer 60 has preset for various situations and the visitor may select, by using the portable camera 56 or the voice-control device, one of the contacts to request assistance according to the situation that the visitor 50 encounters. For example, the customer 60 may set a calling tree such as owner for access issues, a gardener for yardwork issues, the 911 for an emergency.

Figure 6:
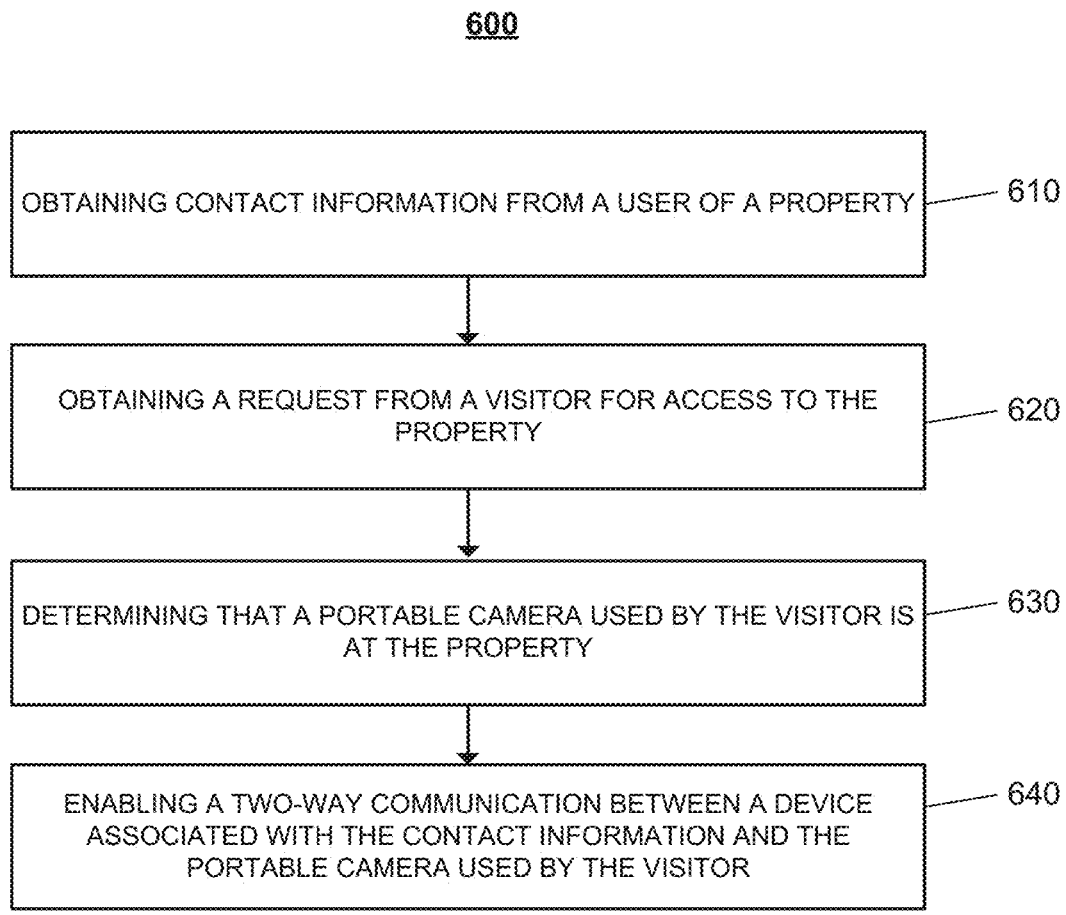
FIG. 6 is a flow chart of an example process for establishing an assistance mode.

FIG. 6 is a flow chart of an example process 600 for establishing a two-way communication between a user of a property and a visitor for the property. The monitoring server 160 obtains contact information from a user of a property (610). The contact information may include preferred contact methods and contact numbers to enable communication with a device associated with the contact information. The user of the property 102 may set the contact information on a one-time basis or an ongoing basis for a type of task of the visitor. In some implementations, the control unit 110 may obtain the contact information from the user of the property 102 or from the monitoring server 160.

In some examples, the user may set second contact information for a specific event that may override a first (e.g., default) contact information that the user has set. For example, the first contact information may be associated with a device of a first user of the property 102, and the monitoring server 160 may establish a two-way communication between the portable camera 56 and the device of the first user of the property 102 if the visitor 50 is at the property 102 for a first task (e.g., delivery of a package). The second contact information may be associated with a device of a second user of the property 102, and the monitoring server 160 may establish a two-way communication between the portable camera 56 and the device of the second user of the property 102 if the visitor 50 is at the property 102 for a second task (e.g., house maintenance).

In some cases, the first task and the second tasks are the same type of task. For example, the property 102 may correspond to a multi-family community or include multiple family members, and the monitoring server 160 may establish a two-way communication between the portable camera 56 and a resident of the multi-family community or a family member corresponding to the delivery task. In some cases, the second contact information may correspond to the third party server 180 or the central alarm station server 170, which the monitoring server 160 communicates with, based on a determination that the visitor 50 does not correspond to a known delivery/service schedule of the property 102.

The monitoring server 160 obtains a request from a visitor for access to the property (620). For example, a third party server 180 (e.g., service provider server) may transmit an access token to the portable camera 56 based on a task assigned to the visitor 50. In some cases, the user of the property 102 may assign an access code for the visitor 50 or for the task. The visitor 50 may request access to the property 102 using a button of the portable camera 56 to transmit the access token to the monitoring server 160. The access token may include information about a schedule of the visit and the visitor 50 such as a time window of the visit, a location of the property 102, an identity of the visitor, and a privilege level of the visitor. The privilege level, for instance, may be associated with an access area or an authorized area that is allowed for the visitor 50 to enter at the property 102. The monitoring server 160 may grant the visitor access to the property 102 based on the information included in the access token.

The monitoring server 160 determines that the portable camera 56 used by a visitor is at the property (630). For example, the monitoring server 160 determines that the portable camera 56 is at the property 102 in response to the request received from the visitor 50 for access to the property 102. In some implementations, similar to 420 of FIG. 4 above, the monitoring server 160 may receive a signal from the portable camera 56, and determine that the portable camera 56 is at the property 102 based on information included in the signal. For example, the monitoring server 160 may receive a signal from a location sensor of the portable camera 56, and determine that the portable camera 56 is at the property 102. In other examples, the monitoring server 160 may utilize the access token from the visitor 50 as described above at 620. For example, the monitoring server 160 may compare the location of the property 102 included in the access token with the signal (e.g., a location sensor signal) from the portable camera 56 to determine that the portable camera 56 used by the visitor is at the property 102.

Based on a determination that the portable camera 56 used by the visitor 50 is at the property 102, the monitoring server 160 enables a two-way communication between a device associated with the contact information from the user of the property 102 and the portable camera used by the visitor (640). For example, the monitoring server 160 may establish a communication session (e.g., teleconference, text-based chat session, a link for push-to-talk) between the user and the visitor 50. In some examples, the monitoring server 160 may put the communication session in a standby status to activate upon receiving an assistance request from the visitor 50 or instruction from the user. For example, a user device 140 (see FIGS. 3A and 3B) is associated with the contact information, and the customer 60 may approve, in response to the request from the visitor 50, a two-way communication utilizing a button or touch input made available at the user device 140.

When the two-way communication is enabled, the portable camera 56 may transmit at least one of a video or a sound recorded by the portable camera 56 to the device associated with the contact information. The portable camera 56 may also receive, from the device associated with the contact information, at least one of a sound, an image, or a video that guides the visitor 50 to a designated location corresponding to the delivery schedule. For example, the customer 60 may talk to the visitor 50 to instruct the designated location or a new location using the two-way communication. In another, the visitor 50 may transmit an image of a package and an area of the property 102 to inform the customer 60 of the location of the package.

Figure 7:
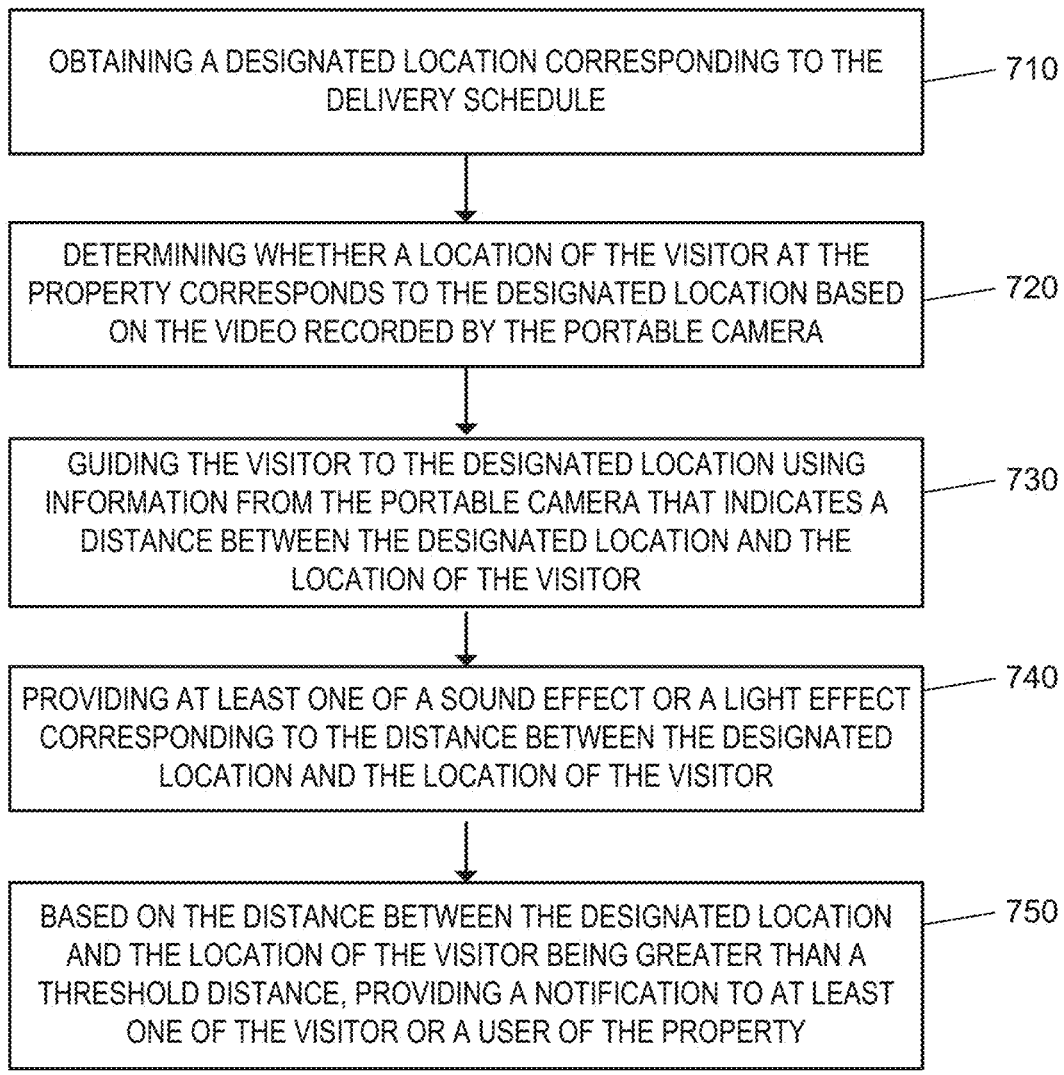
FIG. 7 is a flow chart of an example process for providing guidance for a visitor using an example portable camera.

FIG. 7 illustrates an example process of providing guidance for a visitor at a property using a portable camera. For example, the process 700 includes obtaining a designated location corresponding to the delivery schedule (710), determining whether a location of the visitor at the property corresponds to the designated location based on the video recorded by the portable camera (720), and based on a determination that the location of the visitor at the property does not correspond to the designated location, guiding the visitor to the designated location using information from the portable camera that indicates a distance between the designated location and the location of the visitor (730). In some implementations, the process 700 may further include providing at least one of a sound effect or a light effect corresponding to the distance between the designated location and the location of the visitor (740), and based on the distance between the designated location and the location of the visitor being greater than a threshold distance, providing a notification to at least one of the visitor or a user of the property (750).

For example, the monitoring server 160 (see FIG. 1A, FIG. 1B, or FIG. 5) obtains a designated location corresponding to the delivery schedule (710) from the third party servers 180 such as online merchant sites. The designated location may be a delivery location (e.g., a front door, a kitchen, etc.) or a service location (e.g., a back yard) of the property 102, which is specified in the delivery schedule. In some examples, the control unit 110 of the property 102 obtains the designated location from at least one of the monitoring server 160, the third party servers 180, or the user of the property 102 so that the control unit 110 may provide guidance for the visitor 50 to the designated location.

The control unit 110 determines whether a location of the visitor 50 at the property 102 corresponds to the designated location based on the video recorded by the portable camera (720). Alternatively or in addition, the control unit 110 may determine the location of the visitor 50 using one or more of the video recorded from the portable camera 56, or an image captured by the cameras 130, or information detected by the sensors 120. The control unit 110 then determines whether the location of the visitor 50 corresponds to the designated location. For example, the control unit 110 may determine a distance between the location of the visitor 50 and the designated location based on the video or image recorded by the portable camera 56 and a 3D map of the property 102 that has been determined and stored in the monitoring server 160.

The control unit 110 may guide, based on a determination that the location of the visitor 50 at the property 102 does not correspond to the designated location, the visitor 50 to the designated location using information from the portable camera 56 that indicates the distance between the designated location and the location of the visitor 50 (730). For example, the control unit 110 may receive location information of the portable camera 56 and provide one or more of a direction to the designated location, a distance to the designated location, and an unauthorized area (e.g., bedrooms) of the property 102 that the visitor 50 should not enter. In another, the control unit 110 may receive a new image or video from of the portable camera 56 when the visitor 50 moves to a new location at the property 102 to guide the visitor 50 from the new location to the designated location.

In some implementations, the control unit 110 may provide at least one of a sound effect or a light effect corresponding to the distance between the designated location and the location of the visitor 50 (740). For instance, the control unit 110 may activate a lighting device such as a lamp to illuminate an area of the property 102 or the designated location, or may provide an audio guidance using a speaker (e.g., a smart speaker). In some examples, the control unit 110 may change the sound effect or the light effect corresponding to the distance between the designated location and the location of the visitor 50. For example, a brightness level of the lighting device or a volume of the speaker may increase or decrease as the visitor 50 approaches the designated location.

In some examples where the portable camera 56 includes a display device and speaker, the control unit 110 may provide the light effect and the sound effect regarding various guide information through the portable camera 56. For instance, the portable camera 56 may display screen information that indicates a route from the location of the visitor 50 to the designated location.

In some implementations, the control unit 110 provides, based on the distance between the designated location and the location of the visitor 50 being greater than a threshold distance, a notification to at least one of the visitor 50 or a user of the property 102. For example, the control unit 110 may include a preset threshold distance (e.g., 1 m, 2 m, 5 m, 10 m, etc.) that a visitor is allowed to be spaced apart from the designated location at the property 102. When the distance between the designated location and the location of the visitor 50 is greater than the threshold distance, the control unit 110 may determine that the visitor 50 is lost at the property 102 while locating the designated location or that the visitor 50 enters an unauthorized area of the property 102.

In some implementations, the control unit 110 may provide the portable camera 56 with a path (e.g., a computed path) between an entrance of the property and the designated location. In some examples, the visitor 50 may be allowed to traverse the path or deviate from the path by the preset threshold distance. In some examples, the visitor 50 may need to complete the path to complete a delivery task in an allowed time interval that is preset in the delivery schedule. As described above, in some examples, if the visitor 50 does not complete the path within the allowed time interval, the control unit 110 may provide a notification to the visitor 50 to indicate expiration of the allowed time so that the visitor 50 may request guidance or an extension of time to a user of the property 102. In some examples, the control unit 110 may provide an alert to the user of the property 102 to indicate a potential intrusion or a problem that the visitor 50 may have in performing the delivery task within the allowed time.

The control unit 110 then may alert the visitor 50 using the portable camera 56 or other notification devices (e.g., a speaker) at the property 102. For example, the control unit 110 may cause the portable camera 56 to vibrate when the distance between the designated location and the location of the visitor becomes greater than the threshold distance. Alternatively or in addition, the control unit 110 may provide a notification (e.g., a text message or a phone call) to a user of the property 102 (see FIG. 3B) when the distance between the designated location and the location of the visitor 50 is greater than the threshold distance.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining, from a server by a control unit including a processor, a delivery schedule for a property that includes at least one of a building or a house, wherein the control unit is installed at the property, and the server is located away from the property;
   determining, by the control unit, that a portable camera carried by a human visitor is at the property;
   determining, by the control unit, that the portable camera corresponds to the delivery schedule;
   in response to the control unit determining that the portable camera corresponds to the delivery schedule, transmitting a control signal from the control unit to a lock of the property, wherein the control signal triggers the lock to unlock to allow the human visitor carrying the portable camera to enter the property; and
   obtaining, by the control unit, a video recorded by the portable camera,
   wherein determining that the portable camera carried by the human visitor is at the property comprises:
      obtaining, by the control unit, an image of the portable camera,
      determining, by the control unit, an arrival time indicating when the human visitor has arrived at the property based on the image of the portable camera,
      comparing, by the control unit, the arrival time to an expected time window of the human visitor, the expected time window being included in the delivery schedule for the property,
      based on comparing the arrival time to the expected time window of the human visitor, determining that the arrival time is within the expected time window of the human visitor, and
      based on a determination that the arrival time is within the expected time window of the human visitor, determining that the portable camera carried by the human visitor is at the property.

2. The method of claim 1, further comprising:
   obtaining contact information corresponding to a user of the property; and
   obtaining a request from the human visitor for access to the property,
   wherein determining that the portable camera carried by the human visitor is at the property comprises determining that the portable camera carried by the human visitor is at the property in response to the request from the human visitor for access to the property.

3. The method of claim 2, further comprising enabling a two-way communication between a device associated with the contact information and the portable camera carried by the human visitor based on a determination that the portable camera carried by the human visitor is at the property.

4. The method of claim 3, wherein enabling the two-way communication comprises:
   transmitting at least one of the video or a sound recorded by the portable camera to the device associated with the contact information; and receiving, from the device associated with the contact information, at least one of a sound, an image, or a video to allow the user of the property to guide the human visitor to a designated location corresponding to the delivery schedule.

5. The method of claim 1, further comprising:
obtaining a designated location corresponding to the delivery schedule;
determining whether a location of the human visitor at the property corresponds to the designated location based on the video recorded by the portable camera; and
based on a determination that the location of the human visitor at the property does not correspond to the designated location, guiding the human visitor to the designated location using information from the portable camera that indicates a distance between the designated location and the location of the human visitor.

6. The method of claim 5, wherein guiding the human visitor to the designated location comprises:
providing at least one of a sound effect or a light effect corresponding to the distance between the designated location and the location of the human visitor; and
increasing and decreasing at least one of the sound effect or the light effect according to the distance between the designated location and the location of the human visitor.

7. The method of claim 1, wherein determining that the portable camera carried by the human visitor is at the property comprises:
obtaining, by the control unit, a signal from the portable camera that indicates a least one of a location of the portable camera, an identification code of the portable camera, an access code for the property, or an image of an area of the property;
comparing, by the control unit, information included in the delivery schedule to the signal obtained from the portable camera;
based on comparing the information included in the delivery schedule to the signal obtained from the portable camera, determining that the signal corresponds to the delivery schedule for the property; and
based on a determination that the signal corresponds to the delivery schedule for the property, determining that the portable camera carried by the human visitor is at the property.

8. The method of claim 1, wherein determining that the portable camera corresponds to the delivery schedule comprises:
obtaining, from the portable camera by the control unit, an identification code of the portable camera;
obtaining, from the server by the control unit, one or more expected identification codes included in the delivery schedule;
comparing, by the control unit, the identification code of the portable camera to the one or more expected identification codes;
based on comparing the identification code of the portable camera to the one or more expected identification codes, determining, by the control unit, that the identification code of the portable camera matches one of the expected identification codes; and
based on a determination that the identification code of the portable camera matches one of the expected identification codes, determining, by the control unit, that the portable camera corresponds to the delivery schedule.

9. The method of claim 8, wherein obtaining the identification code of the portable camera comprises detecting the identification code of the portable camera by a sensor installed at the property.

10. The method of claim 1, wherein providing access to the property comprises:
determining an operation status of the portable camera based on the video recorded by the portable camera; and
based on a determination that the operation status of the portable camera corresponds to a normal status, unlocking a door of the property to allow the human visitor to enter the property.

11. The method of claim 10, wherein determining the operation status of the portable camera comprises one or more of:
determining whether the portable camera is occluded based on the video recorded by the portable camera;
determining whether the portable camera communicates with a monitoring system of the property; and
determining an operation status of a component of the monitoring system of the property.

12. The method of claim 1, wherein obtaining the video recorded by the portable camera comprises obtaining one or more images that include a package and an area of the property at which the package is located,
wherein the method further comprises:
based on the one or more images of the package and the area of the property, determining that the package corresponds to the delivery schedule for the property, and
based on a determination that the package corresponds to the delivery schedule for the property, updating a delivery status of the package including a drop-off location of the package corresponding to the area of the property.

13. The method of claim 12, further comprising:
determining a completion of delivery based on the delivery status of the package including the drop-off location of the package;
determining an exit of the human visitor from the property based on the video recorded by the portable camera; and
based on the completion of delivery and the exit of the human visitor, locking a door of the property.

14. The method of claim 13, wherein obtaining the video recorded by the portable camera comprises obtaining the video from the portable camera until the completion of delivery and the exit of the human visitor, and
wherein the method further comprises stopping reception of a new video from the portable camera based on the completion of delivery and the exit of the human visitor.

15. A system for supervising property access, the system comprising:
a portable camera configured to be carried by a human visitor of a property that includes at least one of a building or a house;
a server that is located away from the property; and
a control unit that is installed at the property and comprises a processor, the control unit being configured to:
obtain from the server a delivery schedule for the property,
determine that the portable camera carried by the human visitor is at the property,
determine that the portable camera corresponds to the delivery schedule, in response to determining that the portable camera corresponds to the delivery schedule, transmit a control signal from the control unit to a lock of the property, wherein
the control signal triggers the lock to unlock to allow the human visitor carrying the portable camera to enter the property, and
obtain a video recorded by the portable camera,
wherein the control unit is configured to perform operations to determine that the portable camera carried by the human visitor is at the property, the operations comprising:
obtaining an image of the portable camera,
determining an arrival time indicating when the human visitor has arrived at the property based on the image of the portable camera,
comparing the arrival time to an expected time window of the human visitor, the expected time window being included in the delivery schedule for the property,
based on comparing the arrival time to the expected time window of the human visitor, determining that the arrival time is within the expected time window of the human visitor, and
based on a determination that the arrival time is within the expected time window of the human visitor, determining that the portable camera carried by the human visitor is at the property.

16. The system of claim 15, wherein the control unit is further configured to:
obtain contact information corresponding to a user of the property;
obtain a request from the human visitor for access to the property;
enable a two-way communication between a device associated with the contact information and the portable camera carried by the human visitor based on a determination that the portable camera carried by the human visitor is at the property; and
determine that the portable camera carried by the human visitor is at the property in response to the request from the human visitor for access to the property.

17. The system of claim 15, wherein the control unit is further configured to:
obtain a designated location corresponding to the delivery schedule;
determine whether a location of the human visitor at the property corresponds to the designated location based on the video recorded by the portable camera; and
based on a determination that the location of the human visitor at the property does not correspond to the designated location, guide the human visitor to the designated location using information from the portable camera that indicates a distance between the designated location and the location of the human visitor.

18. At least one non-transitory computer-readable storage medium having stored thereon instructions which, when executed by at least one processor of a control unit, cause performance of operations comprising:
obtaining, from a server by the control unit, a delivery schedule for a property that includes at least one of a building or a house, wherein the control unit is installed at the property, and the server is located away from the property;
determining, by the control unit, that a portable camera carried by a human visitor is at the property;
determining, by the control unit, that the portable camera corresponds to the delivery schedule;
in response to the control unit determining that the portable camera corresponds to the delivery schedule, transmitting a control signal from the control unit to a lock of the property, wherein the control signal triggers the lock to unlock to allow the human visitor carrying the portable camera to enter the property; and
obtaining, by the at least one processor, a video recorded by the portable camera,
wherein determining that the portable camera carried by the human visitor is at the property comprises:
obtaining, by the control unit, an image of the portable camera,
determining, by the control unit, an arrival time indicating when the human visitor has arrived at the property based on the image of the portable camera,
comparing, by the control unit, the arrival time to an expected time window of the human visitor, the expected time window being included in the delivery schedule for the property,
based on comparing the arrival time to the expected time window of the human visitor, determining that the arrival time is within the expected time window of the human visitor, and
based on a determination that the arrival time is within the expected time window of the human visitor, determining that the portable camera carried by the human visitor is at the property.

19. The at least one non-transitory computer-readable storage medium of claim 18, wherein the operations further comprise:
obtaining contact information corresponding to a user of the property;
obtaining a request from the human visitor for access to the property;
enabling a two-way communication between a device associated with the contact information and the portable camera carried by the human visitor based on a determination that the portable camera carried by the human visitor is at the property; and
wherein determining that the portable camera carried by the human visitor is at the property comprises determining that the portable camera carried by the human visitor is at the property in response to the request from the human visitor for access to the property.

* * * * *